(No Model.)
F. MURPHY.
NUT LOCK.
No. 262,090. Patented Aug. 1, 1882.
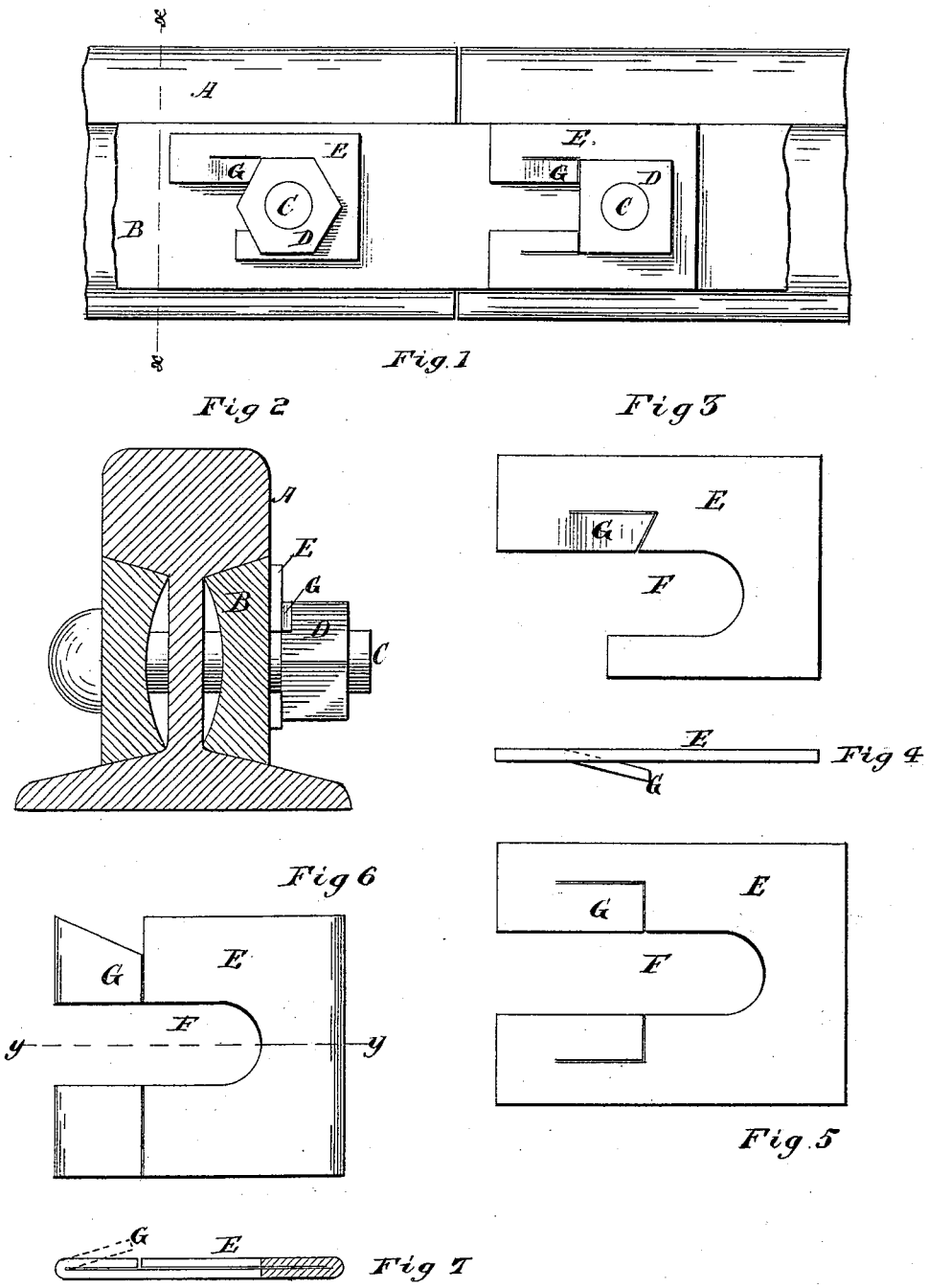
Witnesses
W. C. Cales
Jno. C. MacGregor
Inventor
Francis Murphy
By Coburn & Shacher
Attorneys

UNITED STATES PATENT OFFICE.

FRANCIS MURPHY, OF CHICAGO, ILLINOIS.

NUT-LOCK.

SPECIFICATION forming part of Letters Patent No. 262,090, dated August 1, 1882.

Application filed November 5, 1881. (No model.)

*To all whom it may concern:*

Be it known that I, FRANCIS MURPHY, of the city of Chicago, in the county of Cook, in the State of Illinois, have invented a new and useful Improvement in Nut-Locks, of which the following is a description, reference being had to the drawings hereto annexed, in which—

Figure 1 is a side elevation of a portion of two railway-rails and fish-plates, showing the nut-lock applied; Fig. 2, a transverse sectional view taken at $x$ $x$, Fig. 1. Fig. 3 is a plan view of one of the nut-locks shown in Fig. 1. Fig. 4 is an edge view of the same, showing one part thrown up in position for locking the nut. Fig. 5 is a plan view of the other nut-lock shown in Fig. 1. Fig. 6 is a modified form of the nut-lock shown in Fig. 4. Fig. 7 is an edge view of the lock shown in Fig. 6.

The object of my invention is to make a nut-lock which shall be cheap and efficient, and at the same time be readily applied to the bolt.

My invention consists, first, in so constructing the nut-lock that the part thrown up so as to lock the nut when in place shall present its end to the nut, so that the pressure of the nut against it in becoming displaced will be in the direction of its length and make what I term an "end thrust," so that the piece of thin metal will make a strong resistance compared with the resistance it would make provided the pressure should be against its side.

In the accompanying drawings, A represents the railway-rails tied together; B, the ordinary fish-plates; and C bolts which pass through the neck of the rail and fish-plates, and D the nuts holding the bolts in place.

E represents my nut-lock, having a slot, F, which enables the nut-lock to be slipped upon the bolt laterally without entirely removing the nut. G is that portion of the nut-lock which, when the nut is turned tightly in place, is thrown up, as clearly shown in Figs. 4 and 7, to form a stop to prevent the nut from turning back. This stop presents the end of the metal to the nut, so that the metal will have to be doubled up in order to turn the nut. It presents a strong resistance to the nut, and I am able to use a thin plate in the manufacture of my nut-lock. It makes a much stronger stop than the same stop will make if the nut should strike against its side, giving it a lateral thrust instead of an end thrust, as shown in the accompanying drawings.

It will be observed that the locking-plate accomplishes a double purpose, since the ends of the tongues, while they prevent any rotary movement of the nut, also prevent such locking-plate from slipping off the bolt through the slot which extends to the periphery.

It will be observed that a nut-lock can be made so as to be capable of being reversed or turned over and the stop on the one side used, and if at any time it becomes bent or displaced by turning the nut-lock shown in Fig. 5 over, the other stop could be thrown up and lock the nut. The plate shown in Fig. 3 is not capable of being reversed. The stop in the plate shown in Fig. 3 is adapted to fit a hexagonal nut, while the other plates fit an ordinary four-sided nut.

Any of the nut-locks represented may be applied with a suitable packing or elastic washer of gum, felt, or other suitable material, placed between the nut-lock and the fish-plate, to prevent the chafing of the metal from the violent vibration caused by passing trains, or a metallic spring, spiral or other, may be used instead of the packing; but the nut-locks can be successfully used without either, if desired.

Having thus described my invention, what I claim as new, and desire to secure by Letters Patent, is—

A locking-plate having a slot extending to its edge or periphery, allowing it to be placed on the bolt when the nut is in position, such plate being provided with one or more tongues adapted to be turned outward to present the end thereof to the edge of the nut, whereby the nut is prevented from turning and the locking-plate from slipping off the bolt, as described.

FRANCIS MURPHY.

Witnesses:
P. J. MURPHY,
JNO. C. MACGREGOR.